United States Patent
Machida et al.

(10) Patent No.: US 8,058,599 B2
(45) Date of Patent: Nov. 15, 2011

(54) PHOTOELECTRIC CONVERTER, IMAGE SENSOR, AND SIGNAL READING CIRCUIT

(75) Inventors: Satoshi Machida, Chiba (JP); Masahiro Yokomichi, Chiba (JP)

(73) Assignee: Seiko Instruments Inc. (JP)

( * ) Notice: Subject to any disclaimer, the term of this patent is extended or adjusted under 35 U.S.C. 154(b) by 1716 days.

(21) Appl. No.: 11/174,802

(22) Filed: Jul. 5, 2005

(65) Prior Publication Data

US 2006/0007335 A1 Jan. 12, 2006

(30) Foreign Application Priority Data

Jul. 9, 2004 (JP) ................................. 2004-203671

(51) Int. Cl.
*H01L 27/00* (2006.01)
(52) U.S. Cl. ..................................... 250/208.1; 348/302
(58) Field of Classification Search ............... 250/208.1, 250/214 R, 214 A; 348/294, 300–302, 283, 348/321
See application file for complete search history.

(56) References Cited

U.S. PATENT DOCUMENTS

| | | | |
|---|---|---|---|
| 6,473,204 B1* | 10/2002 | Suzuki et al. ................. | 358/448 |
| 6,839,452 B1* | 1/2005 | Yang et al. .................... | 382/103 |
| 7,015,449 B2* | 3/2006 | Yokomichi et al. ........ | 250/208.1 |
| 7,501,609 B2* | 3/2009 | Yokomichi ................. | 250/208.1 |
| 7,619,669 B2* | 11/2009 | Barna et al. ................... | 348/283 |
| 2003/0155483 A1* | 8/2003 | Yokomichi et al. ........ | 250/208.1 |
| 2004/0245434 A1* | 12/2004 | Yokomichi ................ | 250/208.1 |
| 2005/0062866 A1* | 3/2005 | Ang ................................ | 348/302 |
| 2005/0145777 A1* | 7/2005 | Barna et al. ................ | 250/208.1 |
| 2006/0007335 A1* | 1/2006 | Machida et al. ............. | 348/300 |
| 2009/0040349 A1* | 2/2009 | Xu ................................ | 348/302 |

* cited by examiner

*Primary Examiner* — John Lee
(74) *Attorney, Agent, or Firm* — Adams & Wilks

(57) ABSTRACT

A photoelectric converter has light receiving elements, amplifier circuits connected to respective outputs of the light receiving elements, reset circuits connected to respective outputs of some of the light receiving elements, and connection circuits connected between respective outputs of adjacent ones of the light receiving elements.

13 Claims, 12 Drawing Sheets

PHOTOELECTRIC CONVERTER, IMAGE SENSOR, AND SIGNAL READING CIRCUIT

BACKGROUND OF THE INVENTION

1. Field of the Invention

The present invention relates to a photoelectric converter for converting a received optical signal to an electric signal, an image sensor provided with the photoelectric converter and used in an image reader, and a signal reading circuit.

2. Description of the Related Art

FIG. 9 is a circuit block diagram of an image sensor used in a conventional image reader. FIG. 10 is a circuit block diagram of a shift register and light receiving elements for the image sensor. FIG. 11 is an equivalent circuit of the light receiving elements. FIG. 12 is an operation timing chart of the image sensor.

As shown in FIG. 10, the image sensor changes resolutions by switching connections of the shift register based on a MODE signal. Further, as shown in FIGS. 11 and 12, at a low resolution mode, the image sensor simultaneously reads plural pixel signals into a common signal line. When the resolution is 1/2 for example, the image sensor simultaneously reads two pixel signals into the common signal line (see JP 11-234473 A: pages 7 to 11 and FIGS. 1 to 4).

However, such a conventional image reader requires many elements to form a switching circuit for switching data signals and has a problem of increase in chip area. In particular, when three or more kinds of resolutions are switched, still more elements are needed for switching data signals. Also, when signals of plural light receiving elements are simultaneously read into the common signal line, offsets of amplifiers for amplifying an output of each light receiving element differ from each other, so levels of signals to be read vary depending on resolutions. Thus, a problem occurs in that a circuit for correcting the variation is necessary.

SUMMARY OF THE INVENTION

The present invention has been made to solve such conventional problems and has an object to provide an inexpensive photoelectric converter having a function of switching resolutions, and an image sensor.

According to an aspect of the present invention, there is provided a photoelectric converter, including: plural photoelectric conversion circuits; an amplifier circuit connected to outputs of the photoelectric conversion circuits; a reset circuit connected to outputs of part of the photoelectric conversion circuits; and a connection circuit connected between outputs of adjacent photoelectric conversion circuits of the photoelectric conversion circuits.

Also, the number of the reset circuits is set equal to or less than half the number of the photoelectric conversion circuits, and the number of the connection circuits is set less than the number of the photoelectric conversion circuits. Further, part of the connection circuits is turned ON to realize a function of outputting an average value of the outputs of the adjacent photoelectric conversion circuits through the amplifier circuit. Further, all or part of the connection circuits is turned ON and all or part of the reset circuits is turned ON to realize a function of resetting all of the photoelectric conversion circuits. According to another aspect of the present invention, there is provided a signal reading circuit, including: plural holding circuits; a shift register composed of plural flip-flops; and a common signal line, for sequentially reading plural signals held in the plural holding circuits into the common signal line based on a signal from the shift register, in which clock signals input to the flip-flops and part of inverted signals of the clock signals are both set to Hi to realize a function of skipping to read part of the signals.

With the photoelectric converter of the present invention, by providing the necessary minimum number of inter-light-receiving-element circuits and of reset circuits, outputs of the adjacent light receiving elements can be averaged and output at a low resolution mode.

As described above, the photoelectric converter having a resolution switching function with a simple construction can be provided. In addition, it is possible to provide the inexpensive contact image sensor by mounting the plural photoelectric converters linearly.

DETAILED DESCRIPTION OF THE PREFERRED EMBODIMENTS

Figure 1:
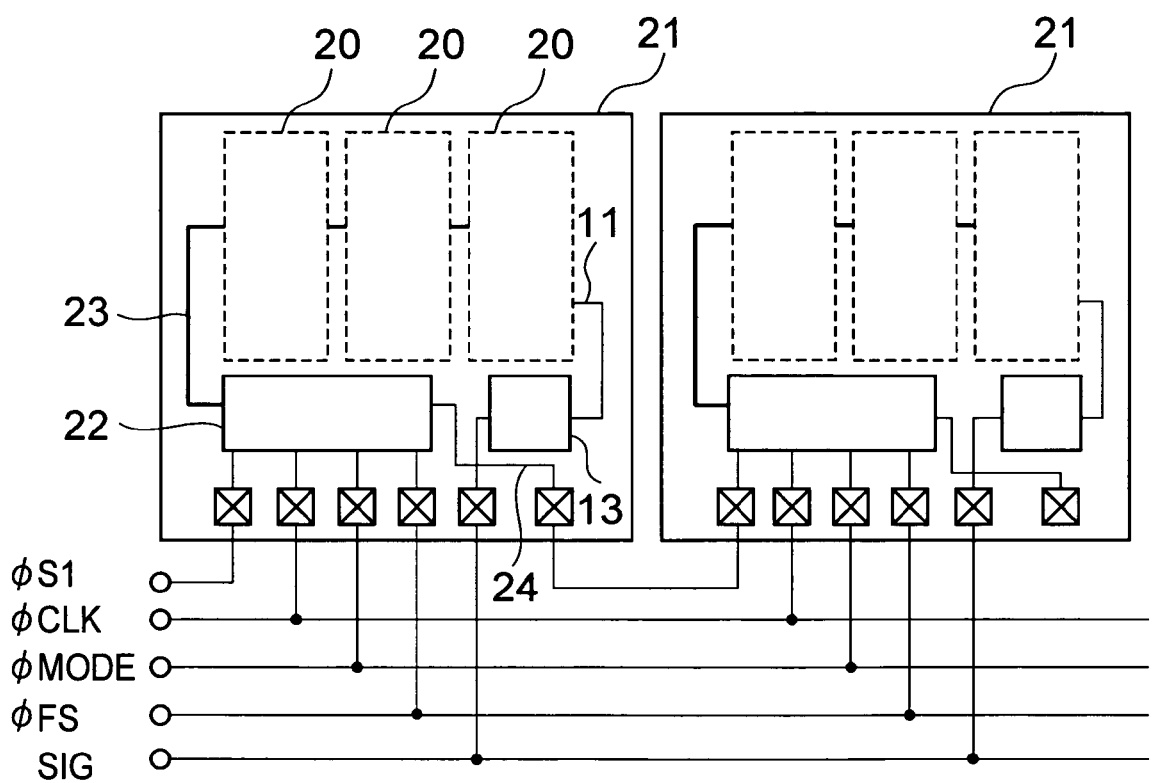
FIG. 1 is a circuit block diagram of a close image sensor of the present invention.

FIG. 1 is a circuit block diagram of a close image sensor of the present invention. The close image sensor of the present invention has plural photoelectric converters 21 mounted therein. According to this embodiment mode, 11 photoelectric converters 21 are arranged and mounted in a single line to constitute the close image sensor, for example.

The photoelectric converter 21 includes plural light receiving elements 20, a logic circuit 22, a signal processing circuit 13, a common signal line 11, and a control signal line 23. Though not shown, a constant current source is connected to the common signal line 11. Connected to all the photoelectric converters 21 are a clock ϕCLK for driving the photoelectric converter, a start pulse ϕFS, a resolution switching signal φMODE, and a signal output PSIG. A start signal φSI of the contact image sensor is connected to the first photoelectric converter 21.

The logic circuit 22 receives input signals φSI, φCLK, φMODE, and φFS, produces from the signals a control signal for controlling the light receiving elements 20 and a read-start signal for the next chip, and reads and outputs them to the control signal line 23 and a read-start signal line 24, respectively. The signal processing circuit 13 amplifies a signal output from the light receiving elements 20 to the common signal line 11 and outputs the amplified signal as the SIG signal. Such a construction is adapted that plural kinds of resolutions are obtained according to the state of φMODE.

Hereinafter, embodiments of the present invention will be described by showing specific circuits.

First Embodiment

In a first embodiment, a description will be given to a contact image sensor having a function of switching three kinds of resolutions: a high resolution mode of 1,200 DPI, an intermediate resolution mode of 600 DPI, and a low resolution mode of 300 DPI. Such a construction is adopted that the high resolution mode, the intermediate resolution mode, and the low resolution mode are respectively obtained when φMODE is at a high level, is at a low level, and is switched from the high level to the low level.

Figure 2:
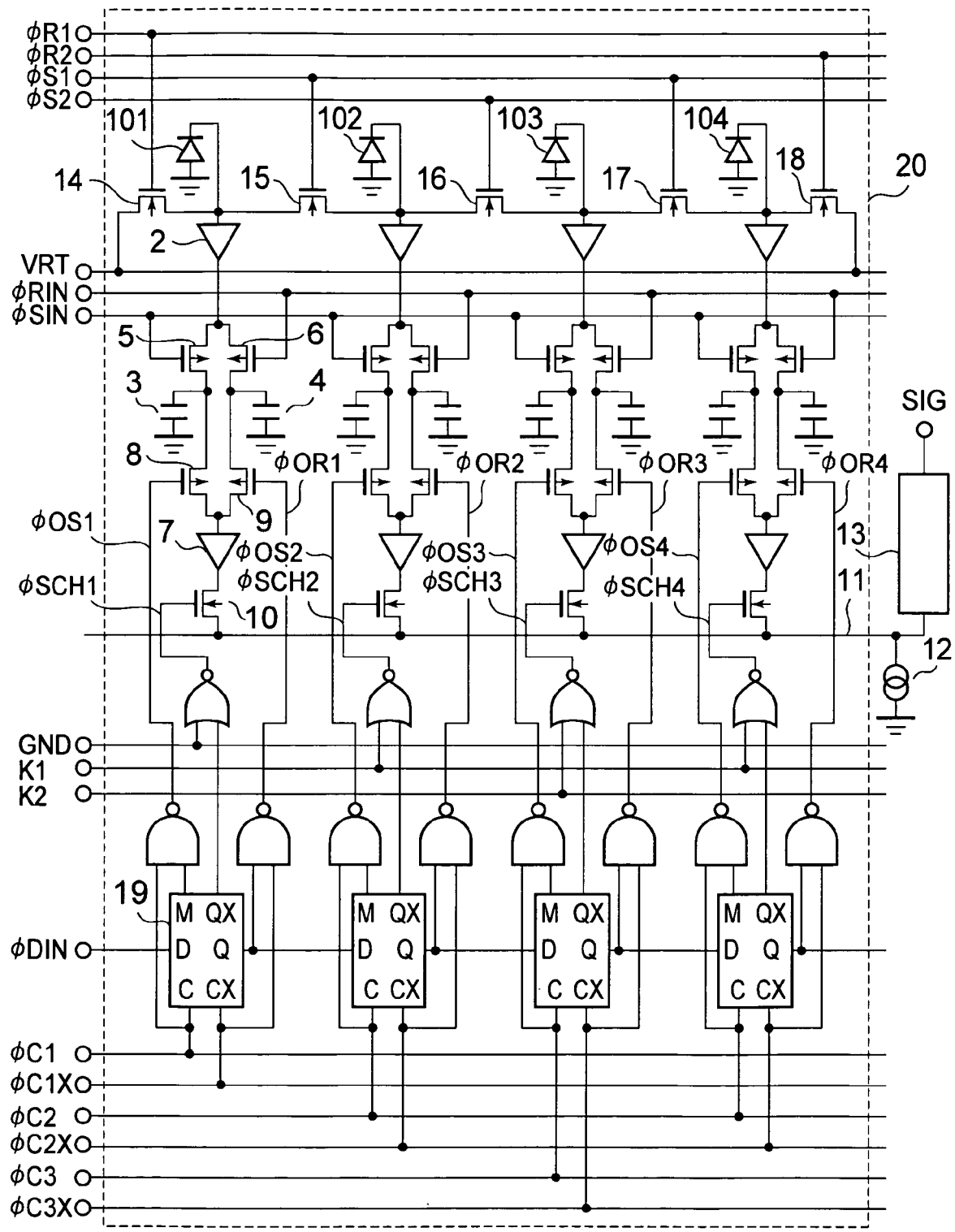
FIG. 2 is a circuit diagram showing signal reading circuits and light receiving elements for four bits, of an image sensor according to a first embodiment of the present invention.

FIG. 2 is a circuit diagram showing signal reading circuits and light receiving elements for four bits, of the image sensor according to the first embodiment. This includes four light receiving elements 101, 102, 103, and 104 as photoelectric conversion circuits, amplifiers 2 as amplifier circuits such as source follower amplifiers, signal voltage holding capacities 3, reference voltage holding capacities 4, signal voltage reading switches 5, reference voltage reading switches 6, source follower amplifiers 7 for reading, read-selection switches 10, signal voltage reading switches 8, reference voltage reading switches 9, a common signal line 11, flip-flops 19, three inter-light-receiving-element switches 15, 16, and 17 as connection circuits, two reset switches 14 and 18 as reset circuits, etc. The common signal line 11 is connected to a constant current source 12 and the signal processing circuit 13 outside this block for the four bits.

The logic circuit 22 of FIG. 1 produces control signals input to this block, namely, φR1, φR2, φS1, φS2, φRIN, φSIN, K1, K2, φDIN, φC1, φC1X, φC2, φC2X, φC3, and φC3X. VRT denotes a reset voltage of the light receiving element and is produced in the photoelectric converter 21 of FIG. 1. GND is usually 0 V.

An operation of the contact image sensor of the present invention will be described below based on a timing chart for each resolution.

Figure 3:
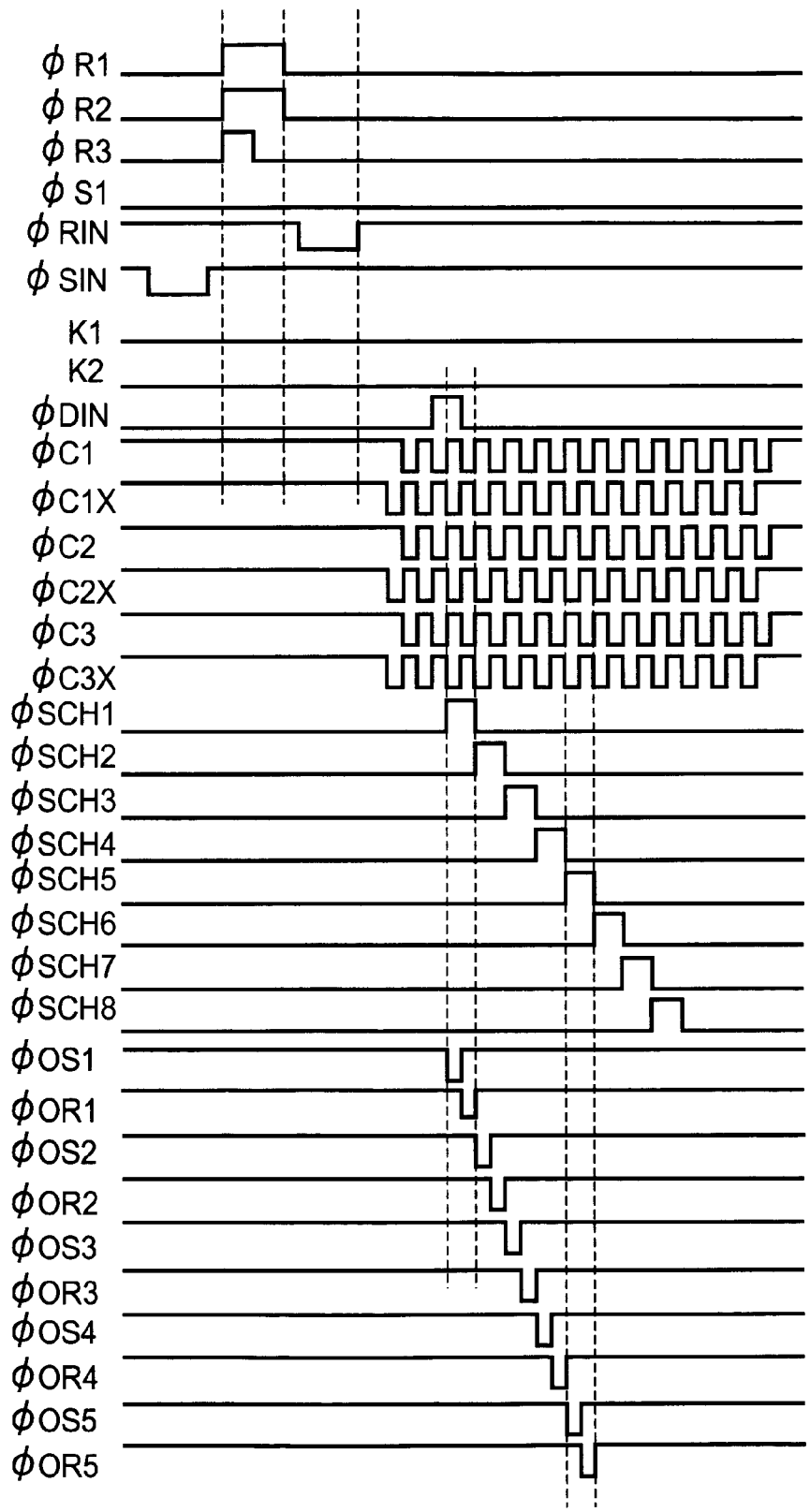
FIG. 3 is a timing chart of an operation of the image sensor at a high resolution mode according to the first embodiment of the present invention.

FIG. 3 is a timing chart of an operation of the contact image sensor at the high resolution mode according to the present invention. This applies to a case when all bit signals are read.

First, a signal batch reading operation will be described. This operation is for reading signal voltages and reference voltages of the light receiving elements into the respective holding capacities, which is simultaneously performed for all light receiving elements of all photoelectric converters.

Each pulse, φR1, φR2, φS1, φS2, φRIN, and φSIN, is produced by being generated at a predetermined timing from an input start pulse φFS, which is simultaneously performed for all photoelectric converters.

With φSIN, optical signals generated according to lights respectively entering the light receiving elements 101 to 104 are respectively forwarded to the signal voltage holding capacities 3 through the amplifiers 2 as signal voltages. Next, with φR1, φR2, and φS1, the reset switches 14 and 18 and the inter-light-receiving-element switches 15 and 17 are turned ON, and outputs from all the light receiving elements 101 to 104 are reset to VRT. Next, when φS1 becomes Lo and the inter-light-receiving-element switches 15 and 17 are turned OFF, output terminals of the light receiving elements 102 and 103 are reset to a level on which off-noises of the inter-light-receiving-element switches 15 and 17 are respectively superimposed. Next, when φR1 and φR2 become Lo and the reset switches 14 and 18 are turned off, output terminals of the light receiving elements 101 and 104 are reset to a level on which off-noises of the inter-light-receiving-element switches 14 and 18 are respectively superimposed. When the inter-light-receiving-element switches and the reset switches respectively have the same sizes, the off-noises are substantially equalized. Thus, reset levels of all the light receiving elements are substantially equalized. Note that the inter-light-receiving-element switch 16 is always kept ON with φ2. After that, accumulation of charge generated according to light entering each light receiving element starts.

Next, with φRIN, reset levels of all the light receiving elements 101 to 104 are forwarded as the reference voltages to the reference voltage holding capacities 4 through the amplifiers 2, respectively.

Next, a signal reading operation will be described. This signal reading operation is for sequentially reading voltages of holding capacities into the common signal line, that is, after reading of the first photoelectric converter ends, reading of the second photoelectric converter starts. φDIN determines the start of reading, which is produced in the logic circuit with the read-start signal φSI and an input signal of the read-start signal line 24. The number of bits to be read varies depending on resolutions, and therefore the timing for outputting φDIN is changed according to φMODE.

Further, the clock signals supplied to the shift register, that is, φC1, φC1X, φC2, φC2X, φC3, and φC3X, are also produced in the logic circuit 22.

When φDIN is input to the flip-flop 19 for the first bit, with φSCH1 and φOS1, the read-selection switch 10 and the signal voltage reading switch 8 are turned ON. Then, the signal voltage for the first bit held in the signal voltage holding capacity 3 is read into the common signal line 11 through the source follower amplifier 7.

Next, with φOS1 and φOR1, when the signal voltage reading switch 8 is turned OFF and thereafter the reference voltage reading switch 9 is turned ON, the reference voltage for the first bit held in the reference voltage holding capacity 4 is read into the common signal line 11 through the source follower amplifier 7.

Next, with φSCH1 and φSCH2, the first bit read-selection switch 10 is turned OFF, the second-bit read-selection switch 10 is turned ON, and reading of the signal voltage for the second bit starts. After that, similarly, reading of the signal voltage and the reference voltage for the second bit starts.

Offsets of the amplifiers 2 and 7 for each bit are superimposed on the signal voltage and the reference voltage for each bit. A fixed pattern noise between the bits can be eliminated by extracting a difference between the signal voltage and the reference voltage by a clamp circuit in the signal processing circuit 13, etc.

Figure 4:
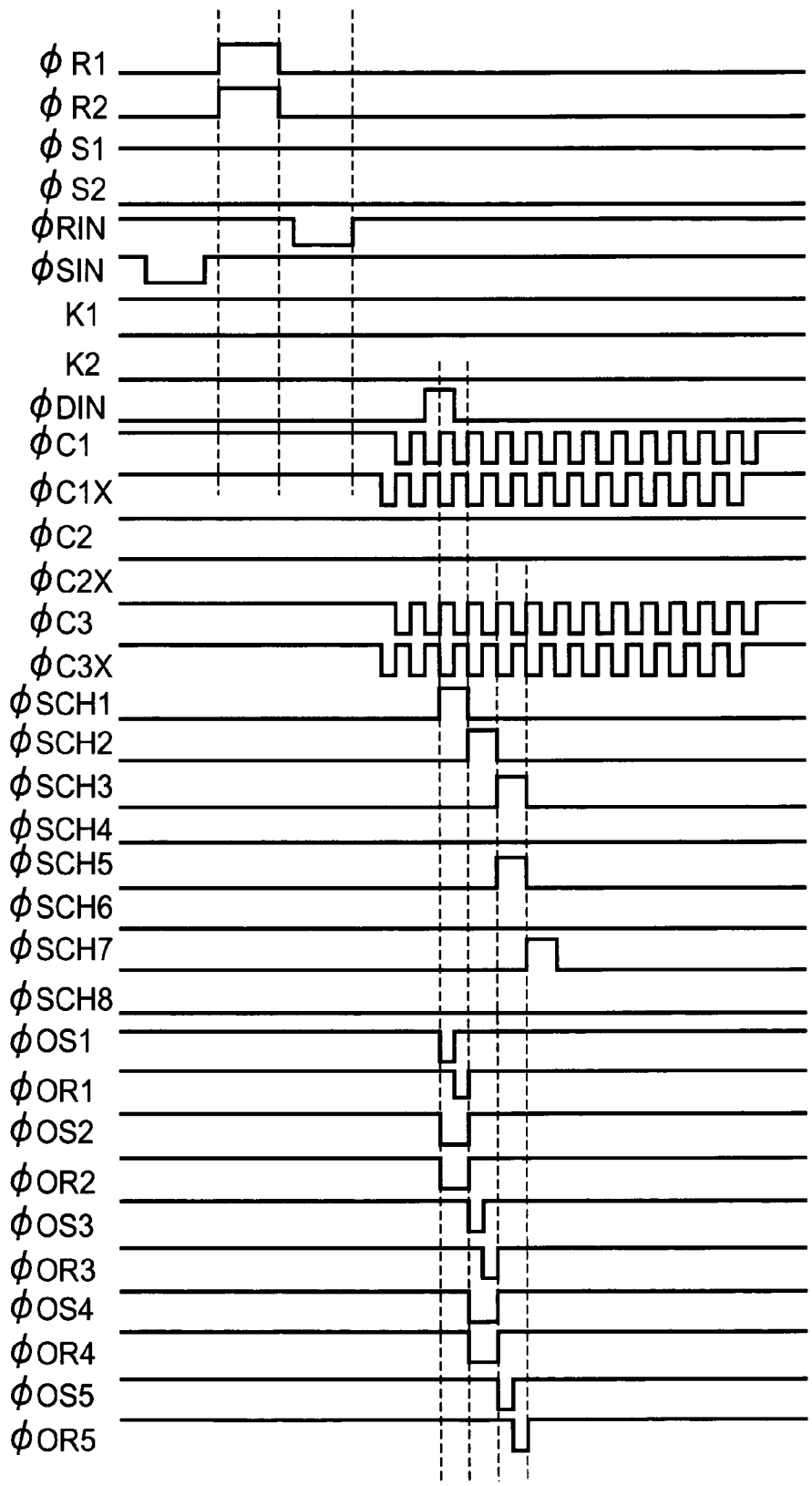
FIG. 4 is a timing chart of an operation of the image sensor at an intermediate resolution mode according to the first embodiment of the present invention.

FIG. 4 is a timing chart of an operation of the contact image sensor at the intermediate resolution mode according to the present invention. This applies to a case when odd-numbered bit signals are read.

First, a signal batch reading operation will be described.

Since φS1 is always kept Hi, the inter-light-receiving-element switches 15 and 17 are kept ON. An output of the light receiving element 101 becomes equal to that of the light receiving element 102 and the output value is the average of the two outputs. The same holds true for outputs of the light receiving elements 103 and 104.

With φSIN, an optical signal of each average value is forwarded to the signal voltage holding capacity 3 through the amplifier 2 as the signal voltage. Next, φR1 and φR2 become Hi, the reset switches 14 and 18 are turned ON, and the outputs of all the light receiving elements 101 to 104 are reset to VRT. Next, when φR1 and φR2 become Lo and the reset switches 14 and 18 are turned OFF, output terminals of the light receiving elements 101 and 102 and output terminals of the light receiving elements 103 and 104 are reset to a level on which off-noises of the reset switches 14 and 18 are respectively superimposed. When the inter-light-receiving-element switches and the reset switches respectively have the same sizes, the off-noises are substantially equalized. Thus, reset levels of all the light receiving elements are substantially equalized. After that, accumulation of charge generated according to light entering each light receiving element starts.

Next, with φRIN, reset levels of all the light receiving elements 101 to 104 are respectively forwarded to the reference voltage holding capacities 4 through the amplifiers 2 as reference voltages.

Next, a signal reading operation will be described.

Among the clock signals (φC1, φC1X, φC2, φC2X, φC3, and φC3X) supplied to the shift register, φC2 and φC2X are always kept Hi, data skips the flip-flops for the second and fourth bits and are not read thereinto. At this time, by setting K1 to Hi, φSCH2 and φSCH4 become Lo, and short-circuit of signals to be read into the common signal line is avoided.

When φDIN is input to the flip-flop 19 for the first bit, with φSCH1 and φOS1, the read-selection switch 10 and the signal voltage reading switch 8 are turned ON and the signal voltage for the first bit held in the signal voltage holding capacity 3 is read into the common signal line 11 through the source follower amplifier 7.

Next, with φOS1 and φOR1, when the signal voltage reading switch 8 is turned OFF and thereafter the reference voltage reading switch 9 is turned ON, the reference voltage for the first bit held in the reference voltage holding capacity 4 is read into the common signal line 11 through the source follower amplifier 7.

Next, with φSCH1 and φSCH3, the first-bit read-selection switch 10 is turned OFF, the third-bit read-selection switch 10 is turned ON, and reading of the signal voltage for the third bit starts. After that, similarly, reading of the signal voltage and the reference voltage for the third bit starts.

Figure 5:
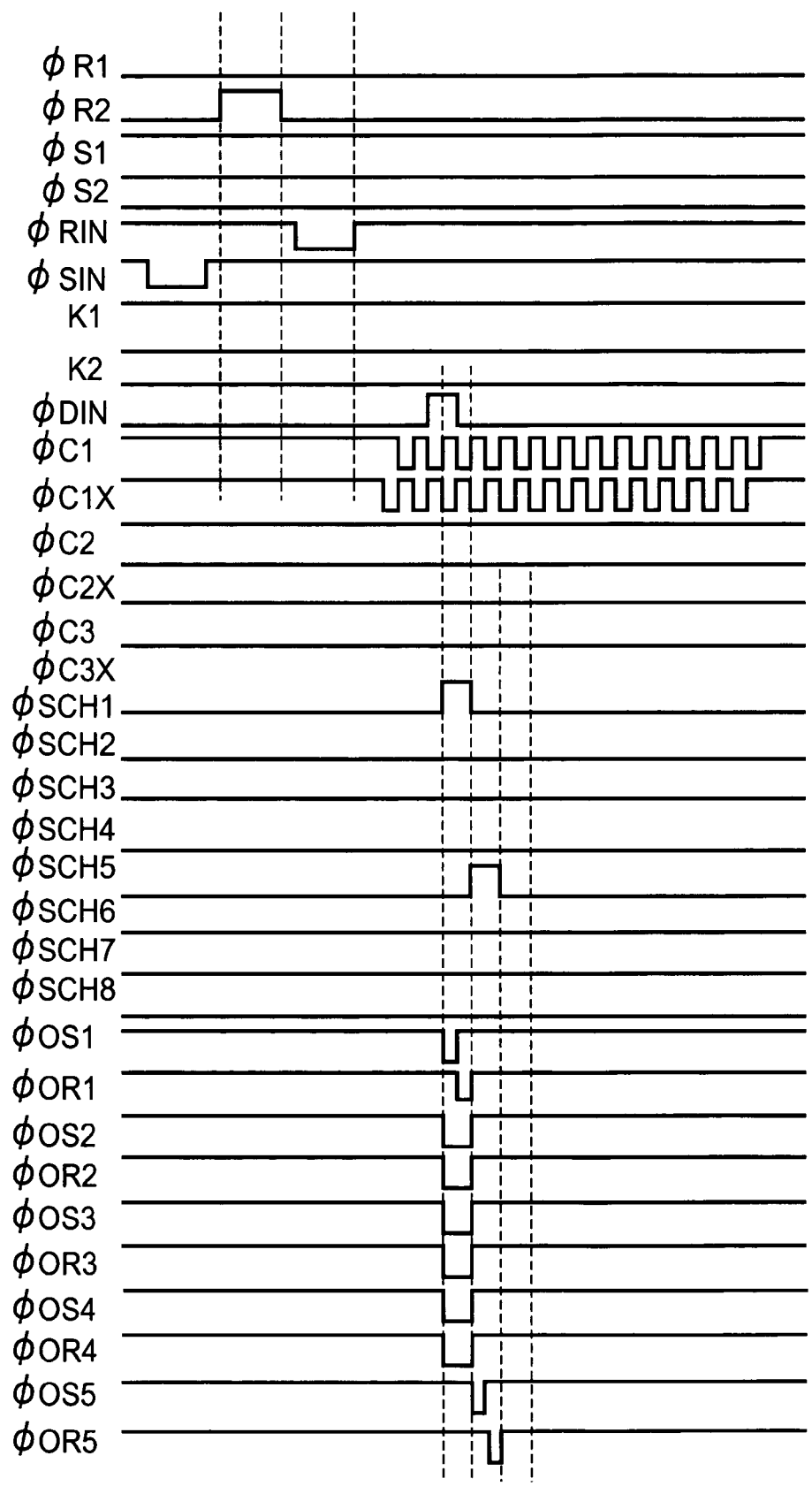
FIG. 5 is a timing chart of an operation of the image sensor at a low resolution mode according to the first embodiment of the present invention.

FIG. 5 is a timing chart of an operation of the contact image sensor according to the present invention at the low resolution mode (300 DPI). This is the case of reading (4N-3)-th bit signal (N is a natural number).

First, a signal batch reading operation will be described.

Since φS1 and φS2 are always kept Hi, the inter-light-receiving-element switches 15, 16, and 17 are kept ON. Outputs of the light receiving elements 101 to 104 are equalized and the output value is the average of the outputs of the four light receiving elements.

With φSIN, an average value of optical signals generated according to lights respectively entering the light receiving elements 101 to 104 is forwarded to the signal voltage holding capacity 3 through the amplifier 2 as the signal voltage.

Next, φR1 becomes Hi, the reset switch 14 is turned ON, and the outputs of all the light receiving elements 101 to 104 are reset to VRT. Next, when φR1 becomes Lo and the reset switch 14 is turned OFF, output terminals of the light receiving elements 101 to 104 are reset to a level on which an off-noise of the reset switch 14 is superimposed. When the inter-light-receiving-element switches and the reset switches respectively have the same sizes, the off-noises are substantially equalized. Thus, reset levels of all the light receiving elements are substantially equalized. After that, accumulation of charge generated according to light entering each light receiving element starts.

Next, with φRIN, reset levels of all the light receiving elements 101 to 104 are respectively forwarded to the reference voltage holding capacities 4 through the amplifiers 2 as reference voltages.

Next, a signal reading operation will be described.

Among the clock signals (φC1, φC1X, φC2, φC2X, φC3, and φC3X) supplied to the shift register, φC2, φC2X, φC3, and φC3X are always kept Hi, data skips the flip-flops for the second, third, and fourth bits and are not read thereinto. At this time, by setting K1 and K2 to Hi, φSCH2, φSCH3, and φSCH4 become Lo, and short-circuit of signals to be read into the common signal line is avoided.

When φDIN is input to the flip-flop 19 for the first bit, with φSCH1 and φOS1, the read-selection switch 10 and the signal voltage reading switch 8 are turned ON and the signal voltage for the first bit held in the signal voltage holding capacity 3 is read into the common signal line 11 through the source follower amplifier 7.

Next, with φOS1 and φOR1, when the signal voltage reading switch 8 is turned OFF and thereafter the reference voltage reading switch 9 is turned ON, the reference voltage for the first bit held in the reference voltage holding capacity 4 is read into the common signal line 11 through the source follower amplifier 7.

Next, with φSCH1 and φSCH5, the first-bit read-selection switch 10 is turned OFF, the fifth-bit read-selection switch 10 is turned ON, and reading of the signal voltage for the fifth bit starts. After that, similarly, reading of the signal voltage and the reference voltage for the fifth bit starts.

Second Embodiment

In a second embodiment, a description will be given to a contact image sensor having a function of switching two kinds of resolutions: 1,200 DPI and 600 DPI. Such a construction is adopted that the high resolution mode and the low resolution mode are respectively obtained when MODE is at a high level and is at a low level.

Figure 6:
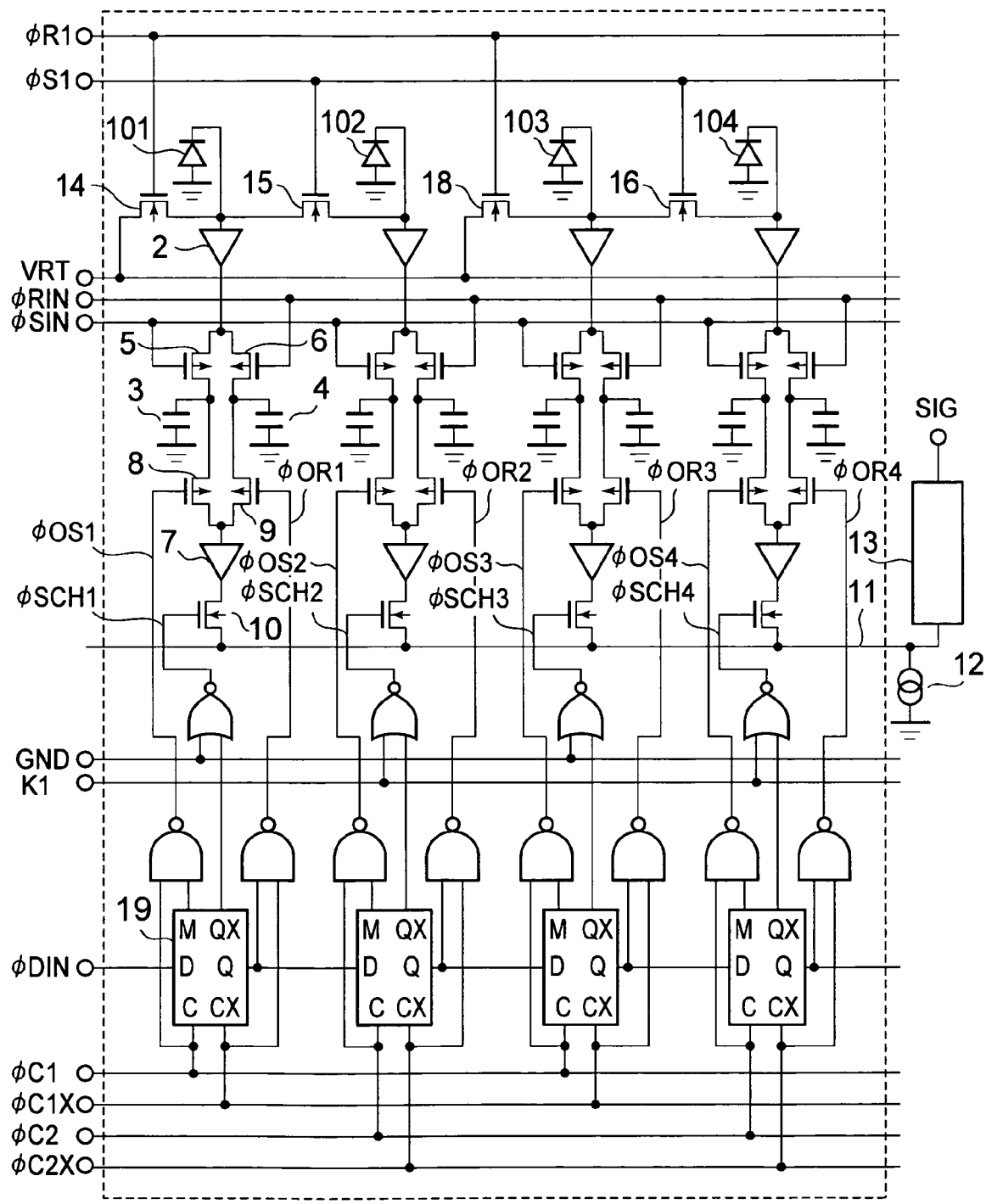
FIG. 6 is a circuit diagram showing signal reading circuits and light receiving elements for four bits, of an image sensor according to a second embodiment of the present invention.

FIG. 6 is a circuit diagram showing signal reading circuits and light receiving elements for four bits, of the image sensor according to the second embodiment. This includes four light receiving elements 101, 102, 103, and 104 as photoelectric conversion circuits, amplifiers 2 as amplifier circuits such as source follower amplifiers, signal voltage holding capacities 3, reference voltage holding capacities 4, signal voltage reading switches 5, reference voltage reading switches 6, source follower amplifiers 7 for reading, read-selection switches 10, signal voltage reading switches 8, reference voltage reading switches 9, a common signal line 11, flip-flops 19, two inter-light-receiving-element switches 15 and 16 as connection circuits, two reset switches 14 and 18 as reset circuits, etc. The common signal line 11 is connected to a constant current source 12 and a signal processing circuit 13 outside this block for the four bits.

The logic circuit 22 of FIG. 1 produces control signals input to this block, namely, φR1, φS1, φRIN, φSIN, K1, φDIN, φC1, φC1X, φC2, and φC2X. VRT denotes a reset voltage of the light receiving element and is produced in the photoelectric converters 21 and 21' of FIG. 1. GND is usually 0 V.

An operation of the contact image sensor of the present invention will be described below based on a timing chart for each resolution.

Figure 7:
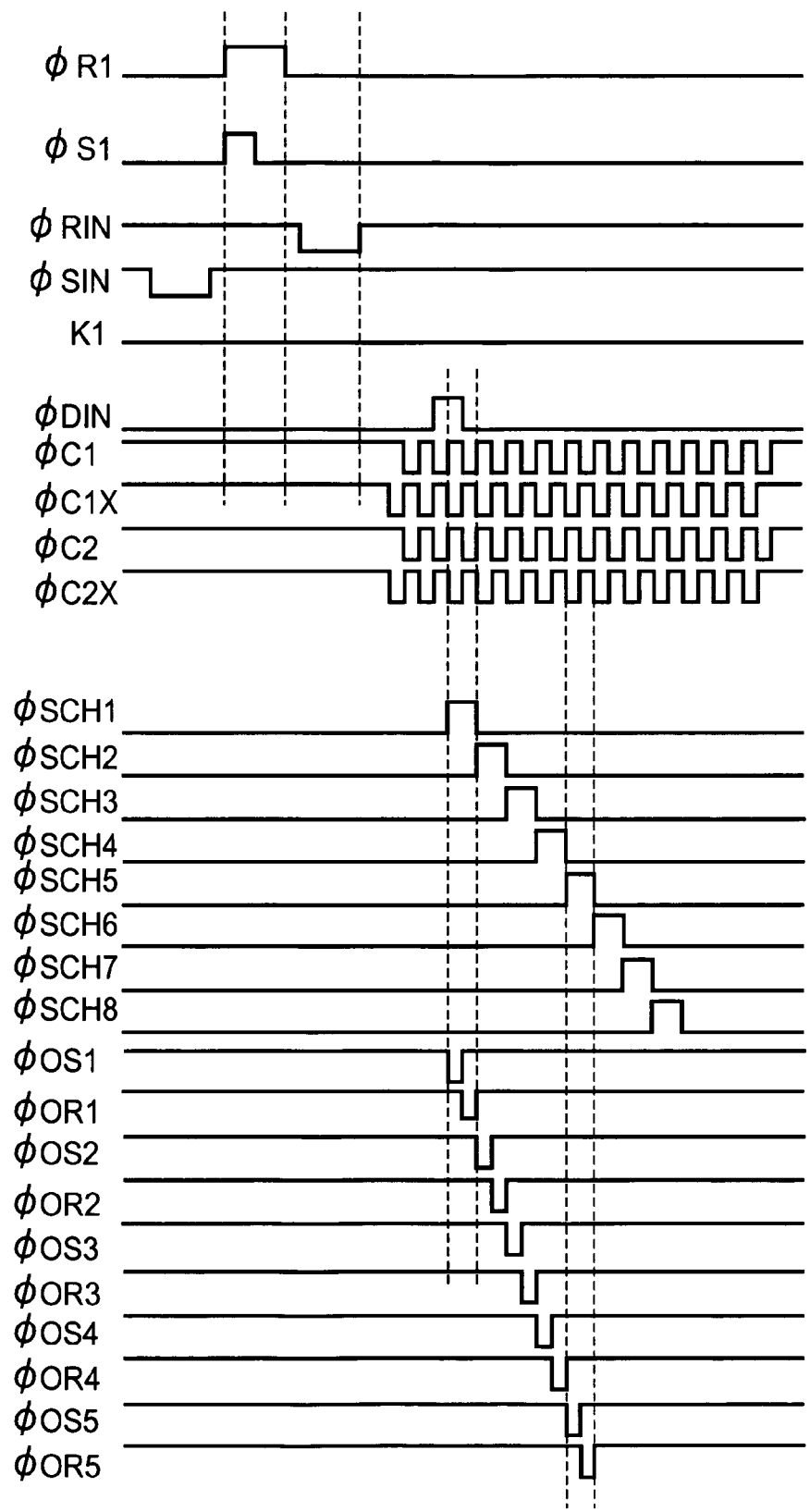
FIG. 7 is a timing chart of an operation of the image sensor at a high resolution mode according to the second embodiment of the present invention.

FIG. 7 is a timing chart of an operation of the contact image sensor at the high resolution mode (1,200 DPI) according to the present invention. This applies to a case when all bit signals are read.

First, a signal batch reading operation will be described. This operation is for reading signal voltages and reference voltages of the light receiving elements into the respective holding capacities, which is simultaneously performed for all light receiving elements of all photoelectric converters.

Each pulse of φR1, φS1, φRIN, and φSIN is produced by being generated at a predetermined timing from an input start pulse φFS, which is simultaneously performed for all photoelectric converters.

With φSIN, optical signals generated according to lights respectively entering the light receiving elements 101 to 104 are respectively forwarded to the signal voltage holding capacities 3 through the amplifiers 2 as signal voltages. Next, with φR1 and φS1, the reset switches 14 and 18 and the inter-light-receiving-element switches 15 and 16 are turned ON, and outputs from all the light receiving elements 101 to 104 are reset to VRT. Next, when φS1 becomes Lo and the inter-light-receiving-element switches 15 and 16 are turned OFF, output terminals of the light receiving elements 102 and 104 are reset to a level on which off-noises of the inter-light-receiving-element switches 15 and 16 are respectively superimposed. Next, when φR1 becomes Lo and the reset switches 14 and 18 are turned off, output terminals of the light receiving elements 101 and 103 are reset to a level on which off-noises of the inter-light-receiving-element switches 14 and 18 are respectively superimposed. When the inter-light-receiving-element switches and the reset switches respectively have the same sizes, the off-noises are substantially equalized. Thus, reset levels of all the light receiving elements are substantially equalized. After that, accumulation of charge generated according to light entering each light receiving element starts.

Next, with φRIN, reset levels of all the light receiving elements 101 to 104 are forwarded as the reference voltages to the reference voltage holding capacities 4 through the amplifiers 2, respectively.

Next, a signal reading operation will be described. This signal reading operation is for sequentially reading voltages of holding capacities into the common signal line, that is, after reading of the first photoelectric converter ends, reading of the second photoelectric converter starts. φDIN determines the start of reading, which is produced in the logic circuit with an input signal of the read-start signal line 24. The number of bits to be read varies depending on resolutions, and therefore the timing for outputting φDIN is changed according to φMODE.

Further, the clock signals supplied to the shift register, that is, φC1, φC1X, φC2, and φC2X are also produced in the logic circuit 22.

When φDIN is input to the flip-flop 19 for the first bit, with φSCH1 and φOS1, the read-selection switch 10 and the signal voltage reading switch 8 are turned ON. Then, the signal voltage for the first bit held in the signal voltage holding capacity 3 is read into the common signal line 11 through the source follower amplifier 7.

Next, with φOS1 and φOR1, when the signal voltage reading switch 8 is turned OFF and thereafter the reference voltage reading switch 9 is turned ON, the reference voltage for the first bit held in the reference voltage holding capacity 4 is read into the common signal line 11 through the source follower amplifier 7.

Next, with φSCH1 and φSCH2, the first bit read-selection switch 10 is turned OFF, the second-bit read-selection switch 10 is turned ON, and reading of the signal voltage for the second bit starts. After that, similarly, reading of the signal voltage and the reference voltage for the second bit starts.

Offsets of the amplifiers 2 and 7 for each bit are superimposed on the signal voltage and the reference voltage for each bit. A fixed pattern noise between the bits can be eliminated by extracting the difference between the signal voltage and the reference voltage by a clamp circuit in the signal processing circuit 13, etc.

Figure 8:
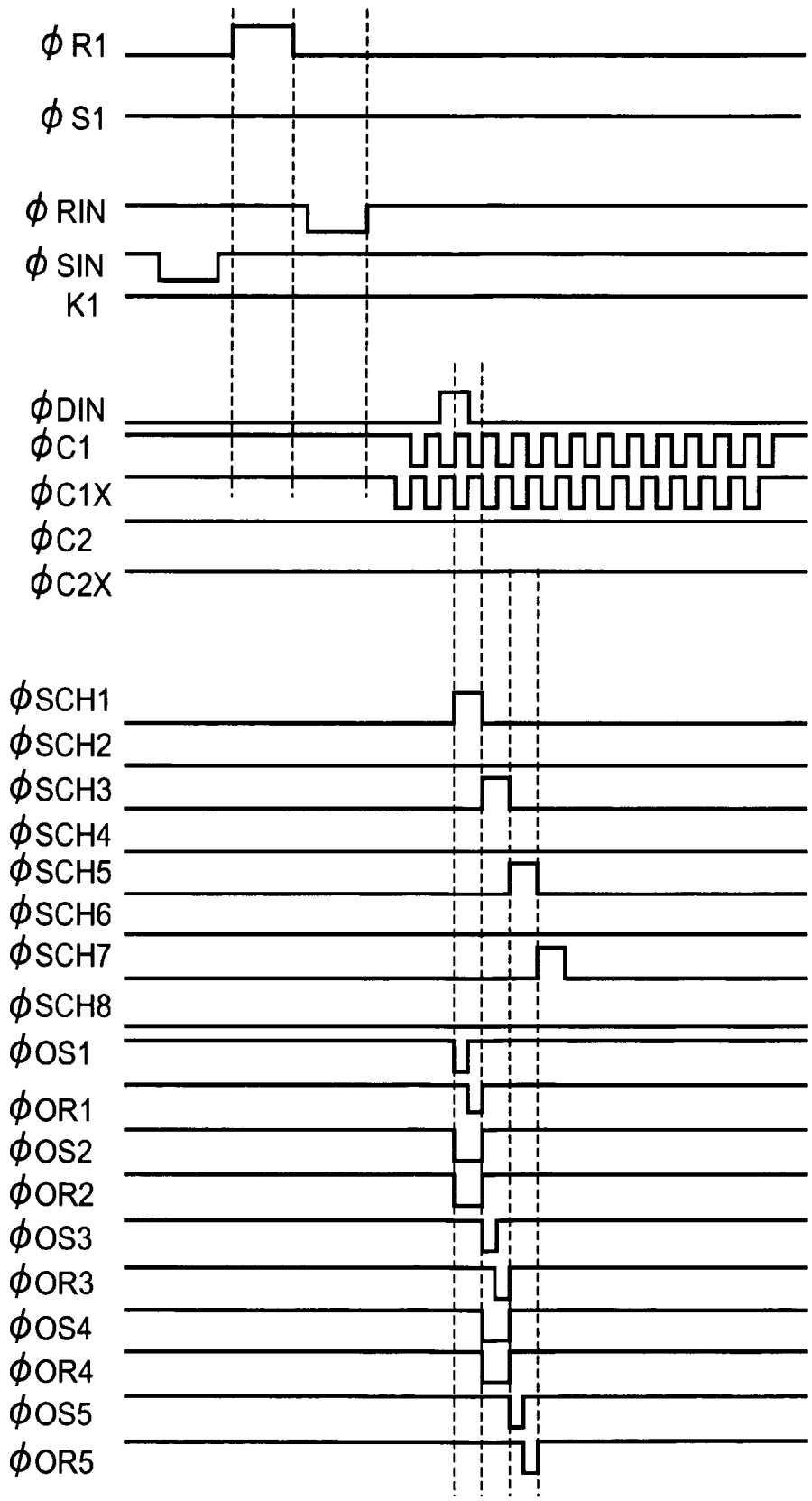
FIG. 8 is a timing chart of an operation of the image sensor at a low resolution mode according to the second embodiment of the present invention.
Figure 9:
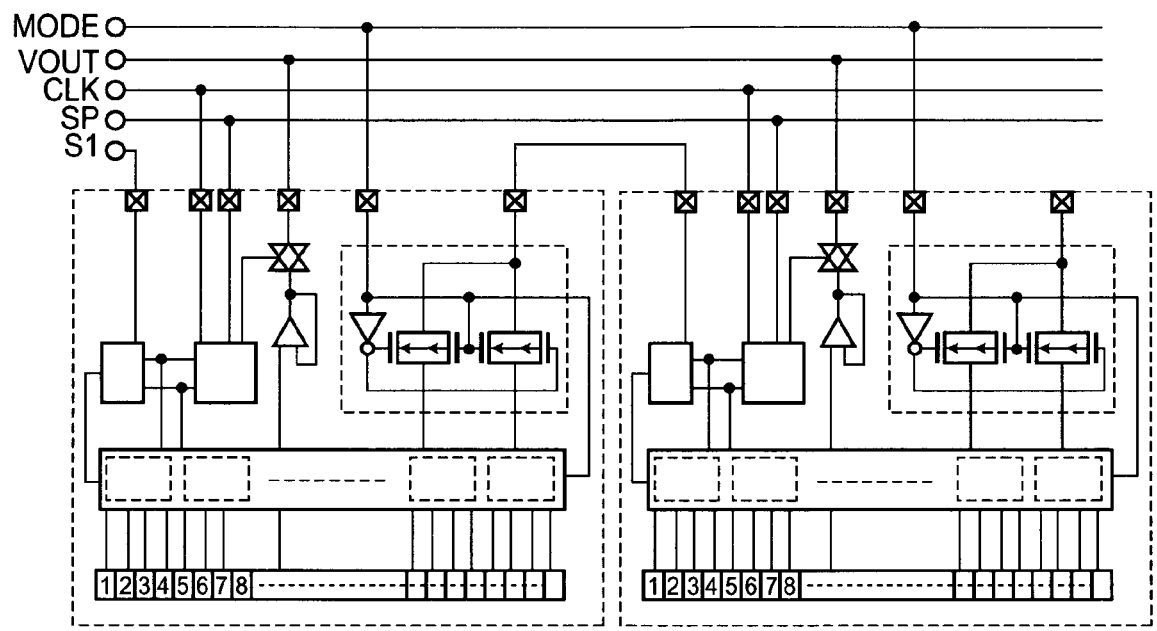
FIG. 9 is a circuit block diagram of a conventional image sensor.
Figure 10:
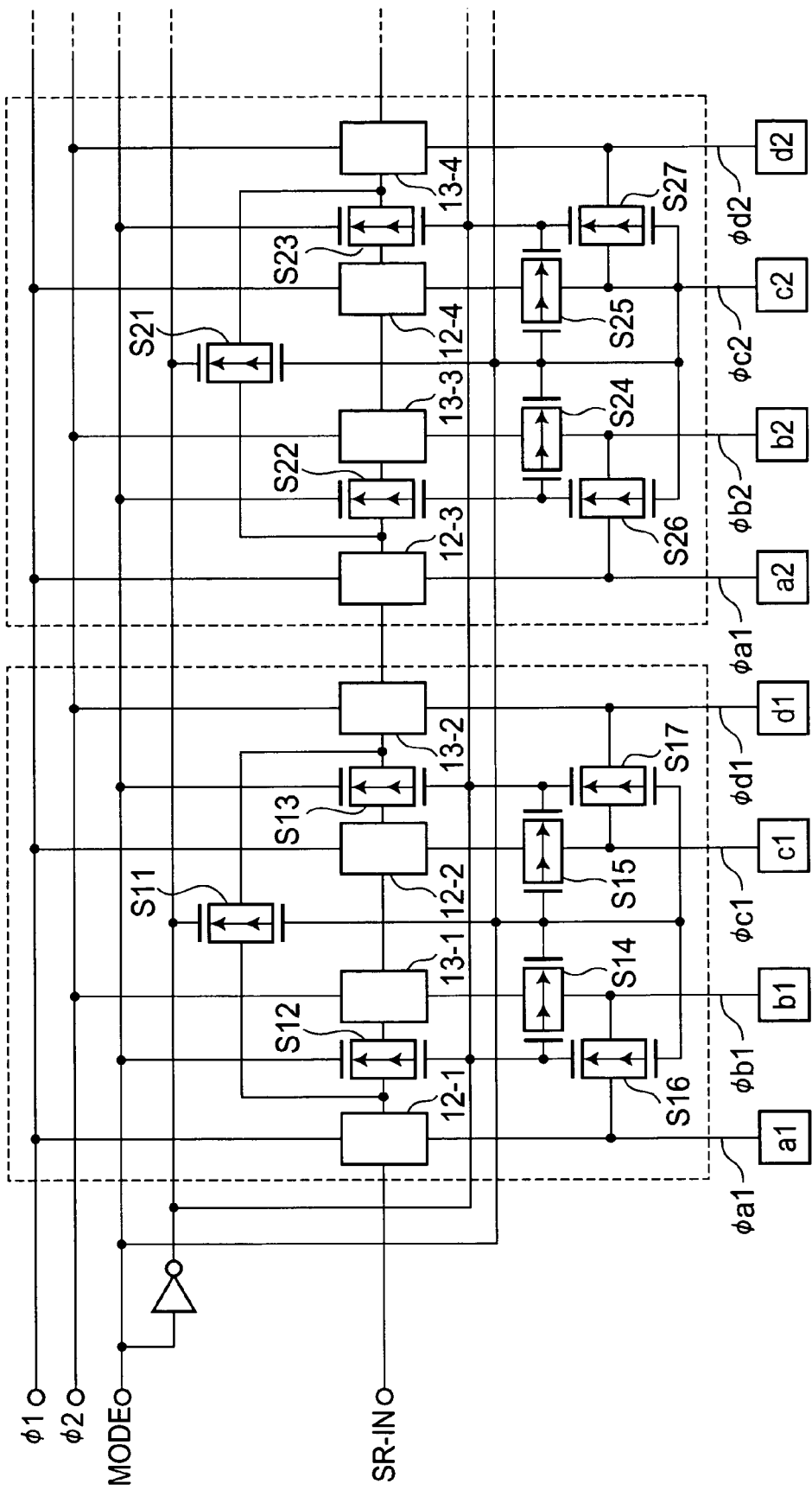
FIG. 10 is a circuit block diagram of a shift register and light receiving elements of the conventional image sensor.
Figure 11:
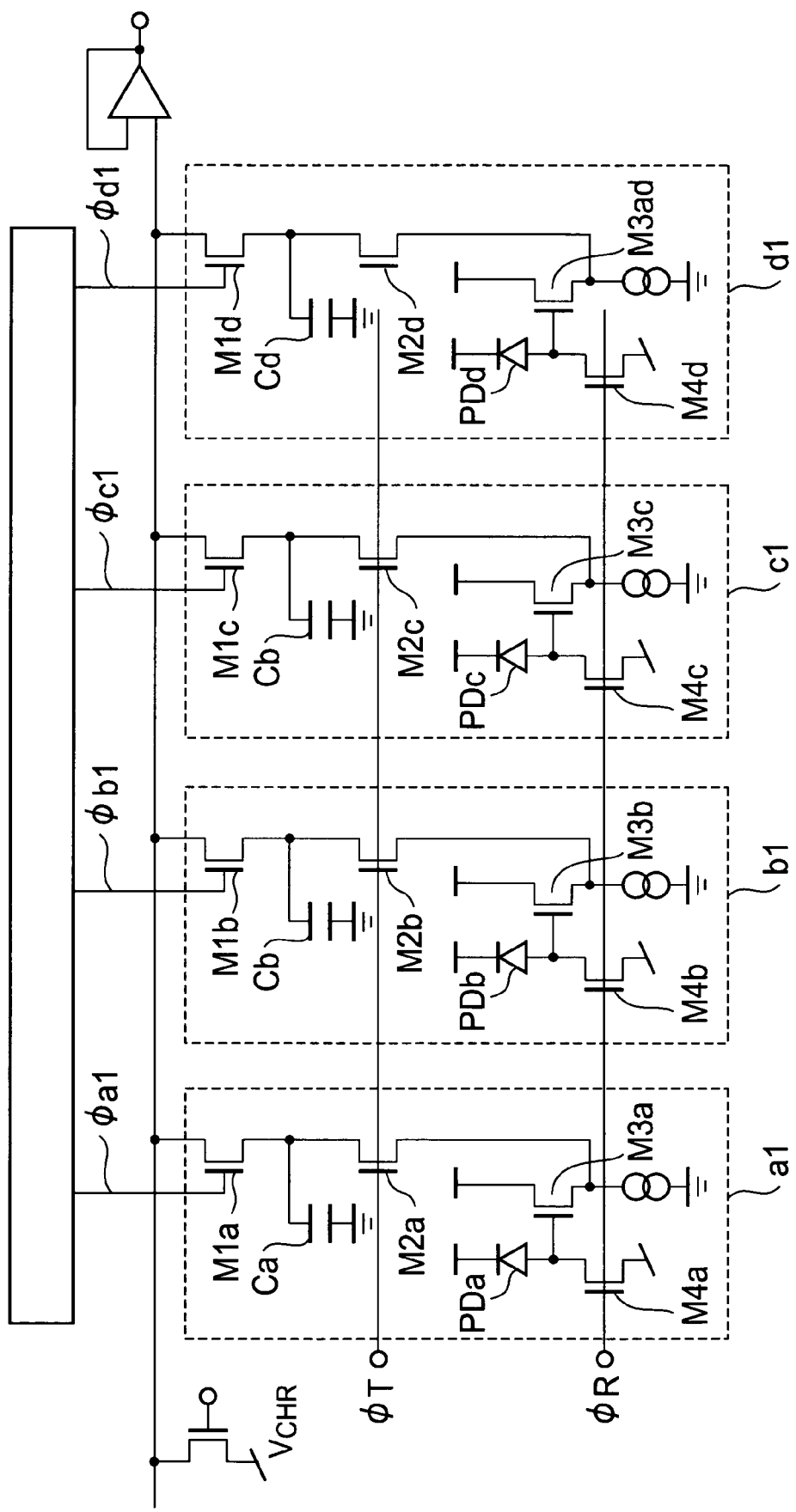
FIG. 11 is an equivalent circuit of the light receiving element of the conventional image sensor.
Figure 12:
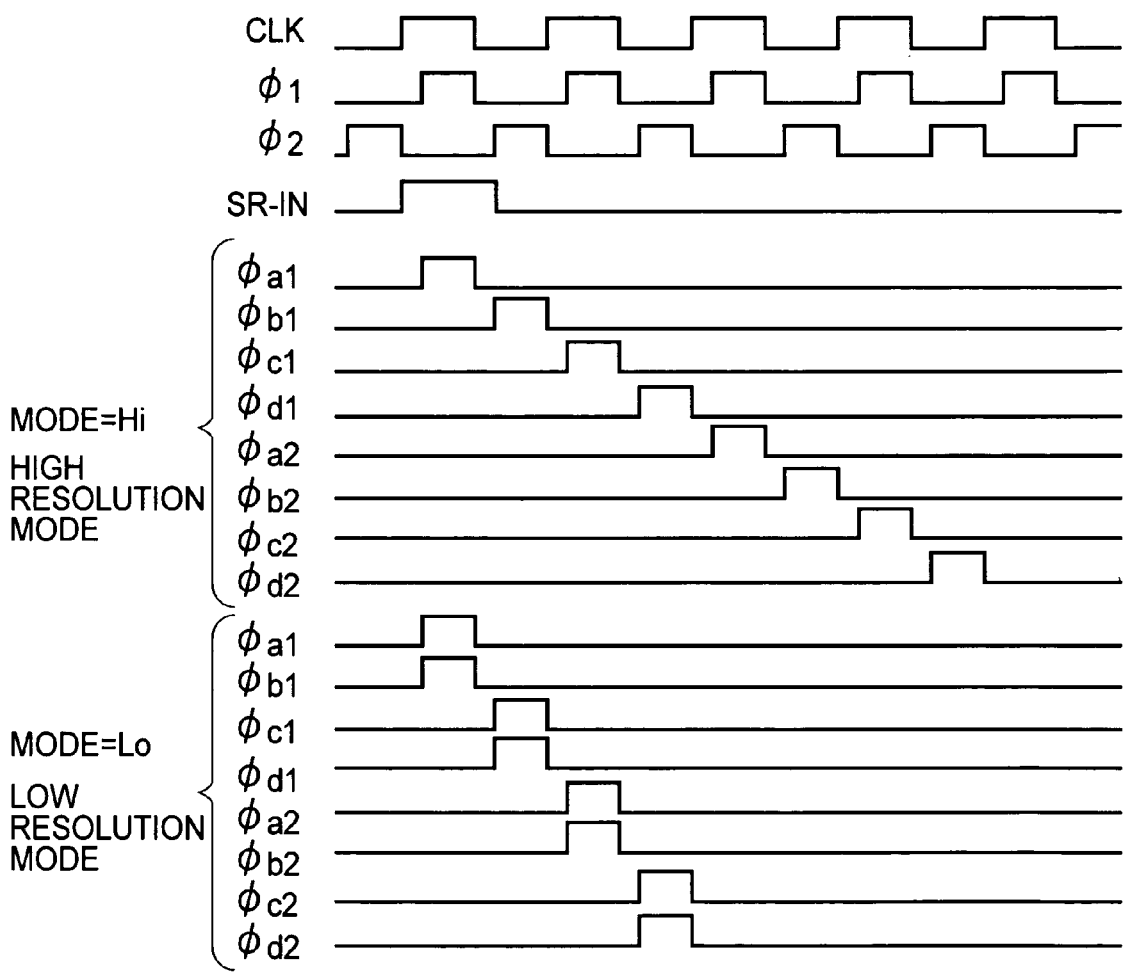
FIG. 12 is an operation timing chart of the conventional image sensor.

FIG. 8 is a timing chart of an operation of the contact image sensor according to the present invention at the low resolution mode (600 DPI). This is the case of reading odd-numbered bit signals.

First, a signal batch reading operation will be described.

Since φS1 is always kept Hi, the inter-light-receiving-element switches 15 and 16 are kept ON. An output of the light receiving element 101 becomes equal to that of the light receiving element 102 and the output value is the average of the two outputs. The same holds true for outputs of the light receiving elements 103 and 104.

With φSIN, an optical signal of each average value is forwarded to the signal voltage holding capacity 3 through the amplifier 2 as the signal voltage. Next, φR1 becomes Hi, the reset switches 14 and 18 are turned ON, and the outputs of all the light receiving elements 101 to 104 are reset to VRT. Next, when φR1 becomes Lo and the reset switches 14 and 18 are turned OFF, output terminals of the light receiving elements 101 and 102 and output terminals of the light receiving elements 103 and 104 are reset to a level on which off-noises of the reset switches 14 and 18 are respectively superimposed. When the inter-light-receiving-element switches and the reset switches respectively have the same sizes, the off-noises are substantially equalized. Thus, reset levels of all the light receiving elements are substantially equalized. After that, accumulation of charge generated according to light entering each light receiving element starts.

Next, with φRIN, reset levels of all the light receiving elements 101 to 104 are respectively forwarded to the reference voltage holding capacities 4 through the amplifiers 2 as reference voltages.

Next, a signal reading operation will be described.

Among the clock signals (φC1, φC1X, φC2, and φC2X) supplied to the shift register, and φC2 and φC2X are always kept Hi, data skips the flip-flops for the second and fourth bits and are not read thereinto. At this time, by setting K1 to Hi, φSCH2 and φSCH4 become Lo, and short-circuit of signals to be read into the common signal line is avoided.

When φDIN is input to the flip-flop 19 for the first bit, with φSCH1 and φOS1, the read-selection switch 10 and the signal voltage reading switch 8 are turned ON and the signal voltage for the first bit held in the signal voltage holding capacity 3 is read into the common signal line 11 through the source follower amplifier 7.

Next, with φOS1 and φOR1, when the signal voltage reading switch 8 is turned OFF and thereafter the reference voltage reading switch 9 is turned ON, the reference voltage for the first bit held in the reference voltage holding capacity 4 is read into the common signal line 11 through the source follower amplifier 7.

Next, with φSCH1 and φSCH3, the first-bit read-selection switch 10 is turned OFF, the third-bit read-selection switch 10 is turned ON, and reading of the signal voltage for the third bit starts. After that, similarly, reading of the signal voltage and the reference voltage for the third bit starts.

What is claimed is:

1. A photoelectric converter, comprising:
    a plurality of light receiving elements;
    a plurality of amplifier circuits connected to respective outputs of the light receiving elements;
    a plurality of reset switches connected to respective outputs of some of the light receiving elements; and
    a plurality of connection circuits connected between respective outputs of adjacent ones of the light receiving elements;
    wherein the number of the reset switches is equal to or less than half the number of the light receiving elements; and
    wherein the number of the connection circuits is less than the number of the light receiving elements.

2. A photoelectric converter according to claim 1; wherein some of the connection circuits are turned ON for outputting an average value of the outputs of the adjacent light receiving elements through the amplifier circuits.

3. A photoelectric converter according to claim 1; wherein all or some of the connection circuits are turned ON and all or some of the reset switches are turned ON for resetting all of the light receiving elements.

4. An image sensor comprising a plurality of the photoelectric converters according to claim 1.

5. A signal reading circuit, comprising: a plurality of holding circuits; a shift register comprised of a plurality of flip-flops into which clock signals are input; and a common signal line into which a plurality of the signals held in the holding circuits are sequentially read based on a signal from the shift register; wherein some of the clock signals input into the flip-flops and inverted signals of the clock signals that are input into the flip-flops are all set to Hi to thereby skip reading into the common signal line of some of the plurality of the signals held in the holding circuits.

6. A photoelectric converter, comprising the signal reading circuit according to claim 5.

7. An image sensor comprising a plurality of the photoelectric converters according to claim 6.

8. A photoelectric converter according to claim 1; wherein the plurality of light receiving elements comprise four light receiving elements, the plurality of reset switches comprise two reset switches, and the plurality of connection circuits comprise three connection circuits.

9. A photoelectric converter according to claim 1; wherein the plurality of light receiving elements comprise four light receiving elements, the plurality of reset switches comprise two reset switches, and the plurality of connection circuits comprise two connection circuits.

10. A photoelectric converter comprising:
    a plurality of linearly-mounted light receiving elements;
    a plurality of amplifier circuits connected to respective outputs of the light receiving elements;
    a plurality of reset switches connected to respective outputs of some of the light receiving elements; and
    a plurality of connection circuits connected between respective outputs of adjacent ones of the light receiving elements, at least some of the connection circuits being maintained in an ON state so that outputs of the adjacent light receiving elements are equalized and an average value of the outputs of the adjacent light receiving elements is outputted through the amplifier circuits; and
    wherein the number of the reset switches is equal to or less than half the number of the light receiving elements; and
    wherein the number of the connection circuits is less than the number of the light receiving elements.

11. An image sensor comprising a plurality of the photoelectric converters according to claim 10.

12. A photoelectric converter according to claim 10; wherein the plurality of light receiving elements comprise four light receiving elements, the plurality of reset switches comprise two reset switches, and the plurality of connection circuits comprise three connection circuits.

13. A photoelectric converter according to claim 10; wherein the plurality of light receiving elements comprise four light receiving elements, the plurality of reset switches comprise two reset switches, and the plurality of connection circuits comprise two connection circuits.

* * * * *